(12) United States Patent
Witherspoon

(10) Patent No.: US 9,667,608 B2
(45) Date of Patent: May 30, 2017

(54) ENHANCED TWO-FACTOR VERIFICATION FOR DEVICE PAIRING

(71) Applicant: Apple Inc., Cupertino, CA (US)

(72) Inventor: Noah A. Witherspoon, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 29 days.

(21) Appl. No.: 14/498,974

(22) Filed: Sep. 26, 2014

(65) Prior Publication Data

US 2016/0094990 A1 Mar. 31, 2016

(51) Int. Cl.
*H04W 12/06* (2009.01)
*H04L 29/06* (2006.01)
*H04W 12/04* (2009.01)

(52) U.S. Cl.
CPC ............ *H04L 63/061* (2013.01); *H04L 63/18* (2013.01); *H04W 12/04* (2013.01)

(58) Field of Classification Search
CPC ......... H04L 9/08; H04L 63/061; H04L 63/18; H04W 12/04
USPC ........................................................ 713/171
See application file for complete search history.

(56) References Cited

U.S. PATENT DOCUMENTS

| 7,831,207 | B2 | 11/2010 | Mercurio et al. |
| 8,254,572 | B2 | 8/2012 | Vaughan et al. |
| 8,260,261 | B2 * | 9/2012 | Teague .................. H04L 9/3273 455/410 |
| 8,405,729 | B2 | 3/2013 | Jain |
| 8,438,288 | B2 | 5/2013 | Garcia Jurado Suarez et al. |
| 8,831,224 | B2 | 9/2014 | Bai et al. |
| 2007/0239405 | A1 * | 10/2007 | Behrens ................. G06Q 10/10 703/2 |
| 2008/0109159 | A1 * | 5/2008 | Shi .......................... G01C 21/32 701/421 |
| 2008/0268776 | A1 | 10/2008 | Amendola |
| 2009/0228707 | A1 | 9/2009 | Linsky |
| 2011/0028091 | A1 | 2/2011 | Higgins et al. |
| 2011/0217950 | A1 | 9/2011 | Kozlay |
| 2013/0198516 | A1 | 8/2013 | Fenton et al. |
| 2014/0298214 | A1 * | 10/2014 | Machalani ............ G06F 3/0484 715/763 |

FOREIGN PATENT DOCUMENTS

WO WO 2010/023506 3/2010

* cited by examiner

*Primary Examiner* — William Powers
*Assistant Examiner* — Aubrey Wyszynski
(74) *Attorney, Agent, or Firm* — Adeli LLP

(57) ABSTRACT

A novel method for out-of-band key verification that improves on both the usability and the security of the numeric-code method is provided. The method use portions of the generated keys as inputs to perform procedural image generation to produce a visualization at each of the two devices that the user can visually compare and confirm. This visualization can be a static image or a motion animation. The method can uses more of the key data to generate visualizations with more features to reduce the likelihood of false matches. The method can also use less key data to allow for quicker comparison and confirmation.

20 Claims, 13 Drawing Sheets

ENHANCED TWO-FACTOR VERIFICATION FOR DEVICE PAIRING

BACKGROUND

When two computing devices need to communicate over an insecure link such as a Wi-Fi or Bluetooth connection, it is often desirable to verify that each device is talking directly to the other—that is, there is no "man in the middle" intercepting messages and masquerading as each device to the other. Even where such communications are encrypted, if the two devices have not previously been connected securely, there must be an initial phase wherein the devices exchange encryption keys or other tokens so that they can then verify each other's identities in subsequent communication. However, if the "man in the middle" can also intercept that initial exchange, then the key-exchange step becomes useless.

For this reason, "pairing" processes between two devices often include a separate "out-of-band" verification step, wherein the devices ask the user to perform some action on both sides of the communication. With this approach, the user acts as a secondary channel for the devices to verify that they are talking directly to each other, making it much harder for a third party to interpose itself into the devices' main communication channel. This process often relies on Diffie-Hellman key exchange, which is a way for two parties (in this case, the pairing devices) to generate a shared secret by exchanging information over an insecure channel. If a third party is intercepting the communications and acting as a man-in-the-middle, the secret generated by the two original parties will differ, and comparison of these two secrets over another channel, e.g. the user, will expose the discrepancy and thereby reveal that the first channel is compromised. The most common approach for this verification—used with many Bluetooth peripherals, as well as in iTunes's® Remote functionality—is to display a numeric code, either (1) on both devices, in which case the user is asked to verify that the codes match, or (2) on only one of the devices, in which case the user is asked to enter an identical code on the other.

SUMMARY

Some embodiments of the invention provide a method for out-of-band key verification that improves on both the usability and the security of the numeric-code method discussed above. Some embodiments use portions of the generated keys as inputs to a piece of software that performs procedural image generation to produce a visualization at each of the two devices that the user can visually compare and confirm. This visualization can be a static image or a motion animation. Some embodiments use more of the key data to generate visualizations with more features to reduce the likelihood of false matches. Some embodiments use less key data to allow for quicker comparison and confirmation.

In some embodiments, the two devices to be paired exchange encrypted information over an unsecured channel with each other. Each of the two devices then produces a shared secret as well as a visualization of the shared secret that can be displayed to the user. The user can then visually compare the visualizations from two devices to determine if shared secret is valid and hence the pairing successful. Once the successful pairing is verified by the user, the two devices can use the validated shared secret to exchange data in a secured fashion.

Relying on visualization for pairing verification makes it easier for the user to detect any mismatches or pairing failures. Some embodiments ensure this by creating visualizations that visibly differ with each other when the underlying key data mismatches. Unlike conventional pairing verification methods in which only around 16 bits of the key data can be reasonably compared by the user as text or numerical strings, many more bits of the key data can be compared by the user when those bits manifest as visible feature in the visualization.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Since encryption keys are often anywhere from 256 to 2048 bits long—i.e. from ~80 to ~600 decimal digits—it would be impractical to ask the user to enter the whole key, or even a reasonable fraction of it. Pairing schemes that require numeric entry or verification usually limit the displayed portion of the key to 12-20 bits, or 4-6 decimal digits. This process is prone to mistakes. In a use case in which the user is asked to verify that the codes from both devices match, the user can easily transpose numbers when comparing the two codes (which risk rises with the code length). In a use case in which the user is asked to enter a code produced by one device identically on the other device, the entry of the code is susceptible to both misreading and mistyping errors. In either case, the code-verification is cumbersome and requires a certain amount of concentration on the user's part, presenting a speed-bump of sorts in an otherwise smooth setup process.

Some embodiments of the invention provide a method for out-of-band key verification that improves on both the usability and the security of the numeric-code method discussed above. Some embodiments use portions of the generated keys as inputs to a piece of software that performs procedural image generation to produce a visualization at each of the two devices that the user can visually compare and confirm. This visualization can be a static image or a motion animation. Some embodiments use more of the key data to generate visualizations with more features to reduce the likelihood of false matches. Some embodiments use less key data to allow for quicker comparison and confirmation.

Several more detailed embodiments of the invention are described below. Section I further describes the enhanced pairing verification by using visualization of shared secret. Section II describes generating visualization from key data. Section III describes an example computing device that implements some embodiments of the invention. Finally, Section IV describes an electronic system with which some embodiments of the invention are implemented.

I. Enhanced Pairing Verification Using Key Visualization

Figure 1:
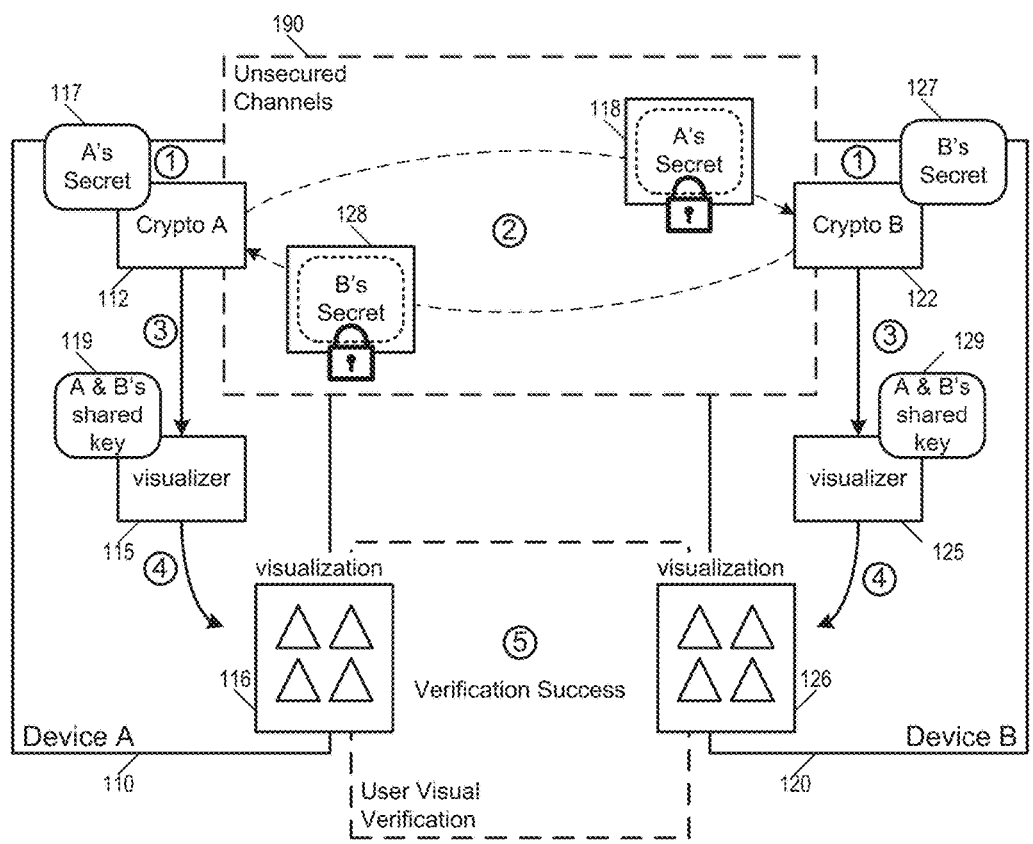
FIG. 1 illustrates a pairing scheme that use out of band visual verification to determine whether two devices have successfully and securely paired with each other.

For some embodiments, FIG. 1 illustrates a pairing scheme that use out of band visual verification to determine whether two devices have successfully and securely paired with each other. In this scheme, the two devices to be paired exchange encrypted information over an unsecured channel with each other. Each of the two devices then produces a shared secret (i.e., a shared key) as well as a visualization of the shared secret that can be displayed to the user. The user can then visually compare the visualizations from two devices to determine if shared secret is valid and hence the pairing successful. (In other words, the user serves as an out of band channel for verification.) Once the successful pairing is verified by the user, the two devices can use the validated shared secret to exchange data in a secured fashion.

As illustrated, the pairing scheme involves two devices 110 (device A) and 120 (device B) that can be communicatively linked over an unsecure channel 190. Each of the two devices can be a smart phone, a media player, a tablet computers, a laptop computers, a desktop computers, a headsets, a computer peripheral, a PDAs, a printer, a storage device, or any computing device capable of communicating data with other devices. In some embodiments, the devices 110 and 120 are also displaying devices capable of producing graphics to the user through a display.

The two devices are both capable of using the unsecured communication channel 190 to communicate with each other. The data communication channel 190 can be over a wired or wireless communication medium by using a data communication protocol such as Bluetooth, WiFi, Ethernet, HPNA, powerline, etc. In some embodiments, the communications channel 190 is presumed to be unsecured, i.e., an eavesdropper can use the communications channel 190 to listen in on the data communication between the two devices 110 and 120. It is also possible that an interloper is able to intercept messages over the communications channel 190 and inject bogus messages for the devices 110 and/or 120. In order to communicate data securely between the devices 110 and 120, the devices in some embodiments encrypt the data by using a secret key that is shared (i.e., the shared secret) between the device 110 and the device 120.

However, in order to establish or generate the shared secret key, the two sides must first exchange some information over the unsecured communication channel 190, which may have eavesdroppers and/or interlopers. Pairing devices in some embodiments therefore exchange information for making the shared secret. Some of these embodiments use cryptographic key exchange methods such as Diffie-Hellman key exchange, or D-H. The Diffie-Hellman key exchange method allows two parties that have no prior knowledge of each other to jointly establish a shared secret key over an insecure communications channel. This shared key can then be used to encrypt subsequent communications using a symmetric key cipher.

In the example of FIG. 1, the device 110 has a private secret key 117 that is known only to the device 110, and the device 120 has a private secret key 127 that is known only to the device 120. The two devices exchange their private secret keys in encrypted form. The device 110 then uses its own private secret key 117 and the encrypted key 128 received from the device 120 to create a proposed shared secret key 119. The device 120 likewise uses its own private secret key 127 and the encrypted key 118 received from the device 110 to create a proposed shared secret key 129. If the exchange of secrets between the two devices is successful, then the proposed shared secret key 119 generated by the device 110 would be identical to the proposed shared secret key 129 generated by the device 120, i.e., the two sides arriving at the same, valid shared secret key.

In order to verify that the shared key generated by the two sides of the exchange is valid (e.g., secured from interlopers and eavesdroppers), the devices 110 and 120 use the user as an out of band verification channel. In some embodiments, the user verifies that the shared secret generated by the device 110 is identical to that generated by the device 120 (and hence is truly "shared"). Some embodiments enhance this user verification process by making it easier for the user to detect differences between the generated keys (or proposed shared secret key) from the device 110 and from the device 120. In some of these embodiments, each of the devices 110 and 120 uses the data content in each's proposed shared key to create a visualization so the user can verify the shared key by comparing the visualizations created by two devices.

In five operations labeled '1' through '5', FIG. 1 illustrates the generation and the verification of the shared secret key between the devices 110 and 120. At the first operation labeled '1', the device 110 uses its crypto engine 112 to encrypt its private key 117 to create the encrypted private key 118, and the device 120 uses its crypto engine 122 to encrypt its private key 127 to create the encrypted private key 128.

At the second operation labeled '2', the devices 110 and 120 exchange their encrypted private keys 118 and 128 (i.e., the device 110 sends the encrypted private key 118 to the device 120 and the device 120 sends the encrypted private key 128 to the device 110) over the unsecured channel 190. Though the encrypted versions of the private keys have been exchanged over the unsecured channel, each private key remains private to its device. This is because the private key of a device is never transmitted in an unsecured/unencrypted form, and it is nearly impossible to reconstruct the private key from the encrypted version of the private key in some embodiments.

At the third operation labeled '3', the crypto engine 112 of the device 110 uses the private key 117 of the device 110 and the encrypted private key 128 received from the device 120 to create the proposed shared key 119, while the crypto engine 122 of the device 120 uses the private key 127 of the device 120 and the encrypted private key 118 received from the device 110 to create the proposed shared key 129. Under key exchange methods such as Diffie-Hellman, it is nearly impossible to derive the shared key between the device 110 and the device 120 from the encrypted private keys 118 and 128 without the unencrypted versions of the private keys 112 and 122. This prevents any interlopers from creating a valid shared key by listening on the exchange between the devices 110 and 120.

At the fourth stage labeled '4', a visualizer module 115 in the device 110 creates a visualization 116 of key data from the proposed shared key 119, and a visualizer module 129 in the device 120 creates a visualization 126 of key data from the proposed shared key 129. In some embodiments, a visualization of a proposed shared key is a numerically generated image/pattern/animation based on the data content in the proposed shared key. The generation of key data visualization will be further described below in Section II.

At the last stage labeled '5', the device 110 presents (e.g., displays) the visualization 116 to the user and the device 120 presents the visualization 126 to the user. The user is then able to verify whether the two devices have the valid shared key by comparing the two visualizations. The user can verify the validity the shared key (and the success of the pairing) by visually examining the two visualizations. The user would know that the pairing has succeeded if the visualizations from the two devices are visually indistinguishable. Conversely, the user would know that the pairing has failed if the visualizations from the two devices are visibly different. Having two different visualizations of the shared key is an indication that at least one visualizations is derived from an invalid key based on failed or compromised key exchange.

Figure 2A:
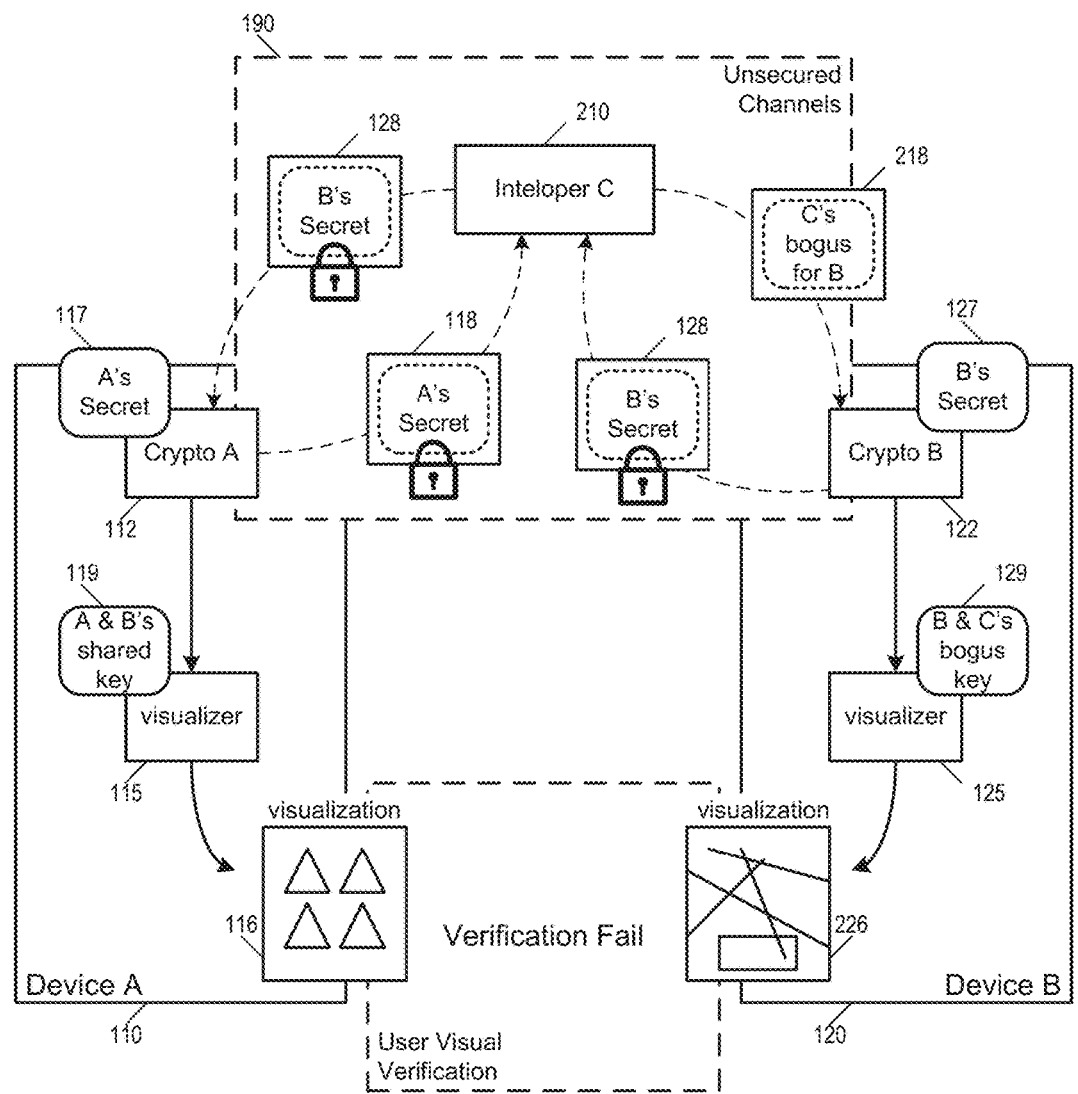
FIGS. 2a-b illustrate examples of failed pairing that results in key visualizations that differ with each other.

For some embodiments, FIG. 2a illustrates an example failed pairing that results in key visualizations that differ with each other. The figure illustrates the same two devices 110 and 120 communicating with each other over the unsecured channel 190. However, the communications over the unsecured channel 190 is also snooped by an interloper device 210 (interloper C). The interloper device 210 can intercept the exchange of the encrypted keys 118 and 128. However, since the interloper device 210 does not have the private secret keys 117 (of the device 110) and 127 (of the device 120), it is nearly impossible for the interloper device 210 to forge a valid shared key with ether the device 110 and 120. The interloper can nevertheless inject bogus encrypted secret to the devices 110 and 120 in an attempt to access those devices. In this example, the interloper 210 passes the encrypted key 128 from the device 120 to the device 110 unmolested but the replaces the encrypted private key 118 with its own bogus secret 218 to the device 120 (in an attempt to coax a bogus pairing with the device 120.)

As illustrated, the device 110, having received the encrypted private secret key 128, is able to arrive at the same proposed shared key 119 and produce the same visualization 116 as in FIG. 1. However, the device 120, having received the bogus encrypted secret 218, is only able to produce a bogus shared key 229. The visualizer 125 of the device 120 in turn produces a (bogus) visualization 226 from the content of the bogus shared key 229. To the user, this bogus visualization 226 would be visibly different from the visualization 116 produced by the device 110. The user would therefore know that the pairing has failed since the two sides were not able to arrive at a same, valid shared secret key.

Figure 2B:
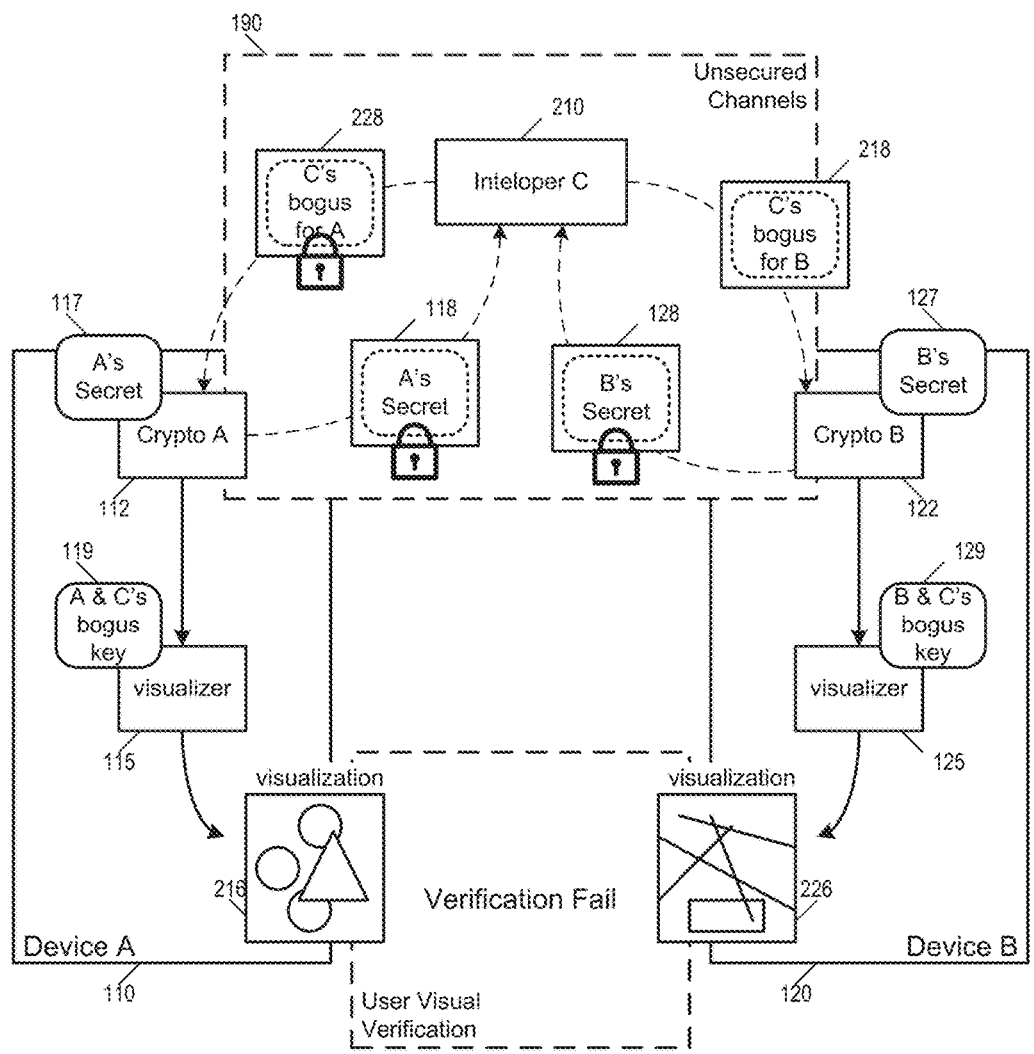

FIG. 2b illustrates another example failed pairing that results in visualizations that differ with each other. The example of FIG. 2b is identical to FIG. 2a, except that the interloper 210 replaces the encrypted private keys 118 with the bogus encrypted secret 218 to the device 120 and the encrypted private key 128 with the bogus encrypted secret 228 to the device 110, respectively. Consequently, the device 110 generates a bogus shared key 219 from its secret key 117 and the received bogus secret 228, and the device 120 generates a bogus shared key 229 from its secret key 127 and the received bogus secret 218.

The visualizer 115 in the device 110 generates a visualization 216 from the content of the bogus shared key 219 and the visualizer 125 in the device 120 generates the visualization 226 from the content of the bogus shared key 229. Since it is nearly impossible for these two bogus shared keys 219 and 229 to have the same data content, the visualizations of those bogus keys are also necessarily different. The user would therefore know that the pairing has failed since the two sides were not able to arrive at a same, valid shared secret key.

Figure 3:
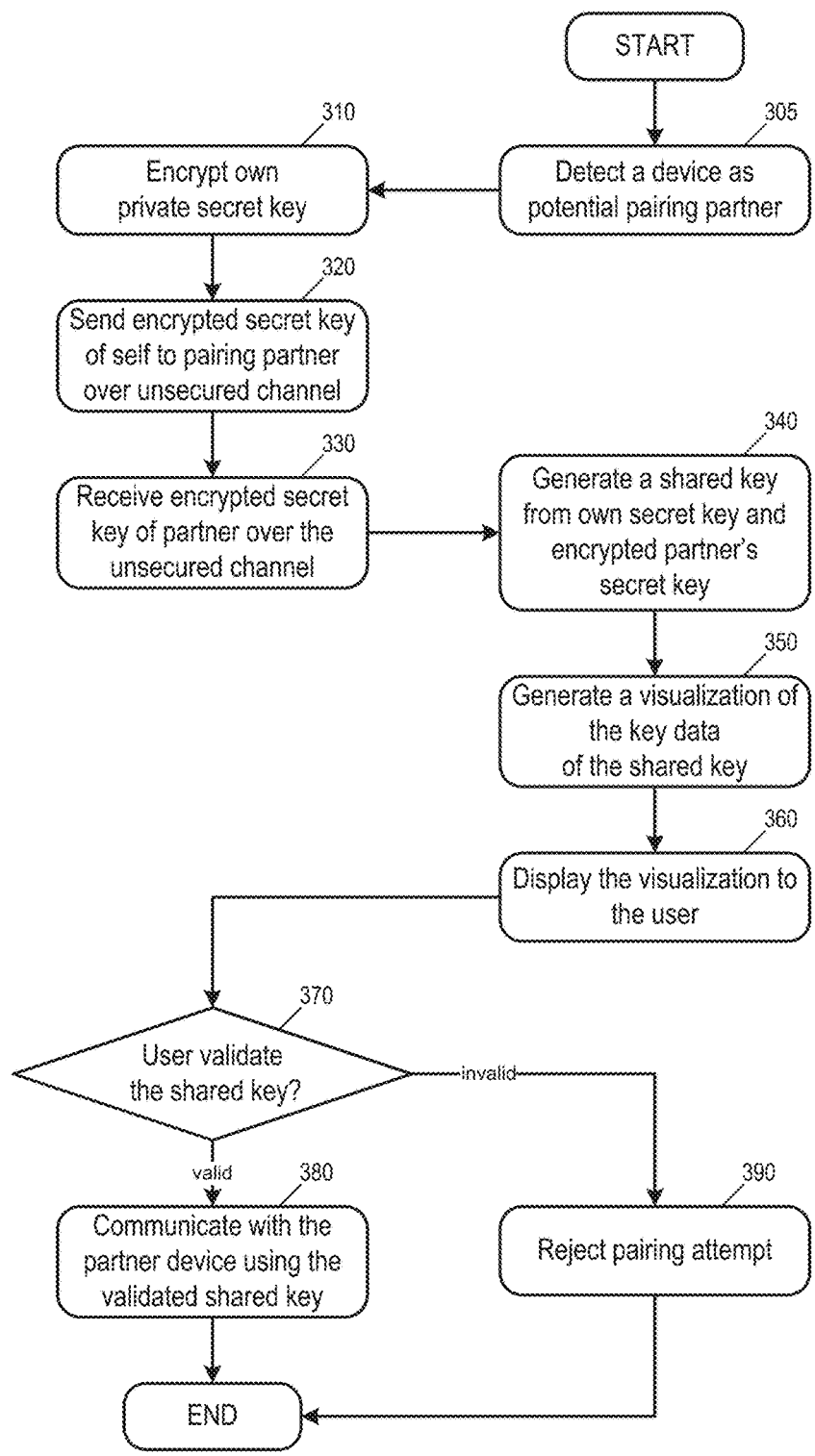
FIG. 3 conceptually illustrates a process for using visualization of shared key to perform pairing verification.

For some embodiments, FIG. 3 conceptually illustrates a process 300 for using visualization of shared key to perform pairing verification. The process 300 is performed by a computing/communications device such as the devices 110 and 120 in some embodiments.

The process starts when the local device running the process detects (at 305) that there is a device that it can pair with (e.g., through Bluetooth inquiry protocol). The process then encrypts (at 310) its own private secret key and sends (at 320) the encrypted private secret key over the unsecured channel to the pairing partner device. The process also receives (at 330) an encrypted key of the pairing partner device over the unsecured channel. The process then generates (at 340) a proposed shared key from own private secret key and the received encrypted key from the pairing partner. This proposed shared key is "proposed" because it is not yet validated. In some embodiments, the operations 310, 320, 330, and 340 are performed in accordance with established encryption key exchange protocol such as Diffie-Hellman.

Next, the process generates (at 350) a visualization of the key data in the proposed shared key. The generation of the shared key visualization will be described below in Section II. The process then displays (at 360) the generated visualization to the user so the user can serve as an out-band verification channel for the pairing process.

The process then determines (at 370) the validity of the proposed shared key based on user validation. If the proposed shared key is valid, the visualization of the proposed shared key would be visually indistinguishable (i.e., matches) the visualization displayed by the partner device. Inn some embodiments, the user validation is based on user input, who either confirms that the two visualizations provided by the two devices match (hence the shared key is valid) or that the two visualizations provided by the two devices do not match (hence the shared key is invalid). If the shared key is valid, the process proceeds to 380. Otherwise the process 300 rejects (at 390) the pairing attempt and then ends.

At 380, the process communicates with the partner device by using the validated shared key (by e.g., using the shared key to encrypt and decrypt subsequent data communication between the two devices.). The process 300 then ends.

II. Generating Visualization from Key Data

Relying on visualization for pairing verification makes it easier for the user to detect any mismatches or pairing failures. Some embodiments ensure this by creating visualizations that visibly differ with each other when the underlying key data mismatches. Unlike conventional pairing verification methods in which only around 16 bits of the key data can be reasonably compared by the user as text or numerical strings, many more bits of the key data can be compared by the user when those bits manifest as visible feature in the visualization.

Figure 4:
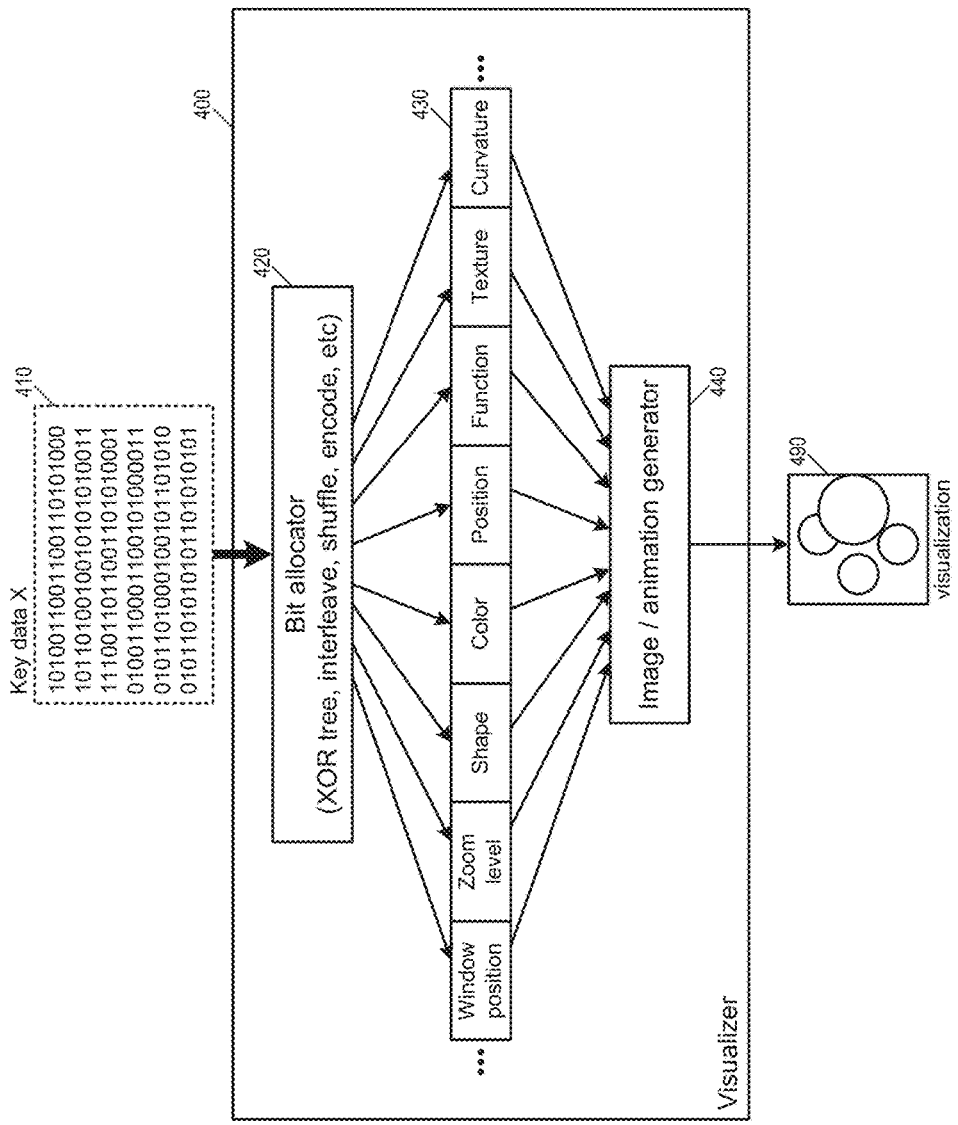
FIG. 4 illustrates an example key visualizer that creates a visualization from the content of a key.

FIG. 4 illustrates an example key visualizer 400 that creates a visualization 490 from the content of a key 410. For some embodiments, the key 410 is a proposed shared key generated by a device during the pairing process (such as the proposed shared key 119 generated by the device 110).

As illustrated, the key visualizer includes a bit allocator 420 and an image/animation generator. The bit allocator 420 allocates bits in the key 410 into various visible features 430 of the visualization 490. The image or animation generator 440 then generates the visualization 490 based on the allocated bits.

Different embodiments perform bit allocation for visualization differently. In some embodiments, all bits in the key data 410 are used to create the visualization 490, i.e., all bits are allocated into a visible feature of the visualization. In some embodiments only some of the bits are allocated. In some embodiments, some or all of the bits are allocated into multiple visible features. In some embodiments, bits are combined together by exclusive-or (XOR) function or other Boolean functions (AND, NAND, NOR, etc.) before being allocated.

The visible features 430 includes a set of visual features for the visualization 400 such as window position, zoom level, shape, color, position, function, texture, curvature, etc. Different embodiments employ different types of visualization, and different types of visualization can have different set of visual features. Each of these visible features is specified by one or more bits from the bit allocator (and hence from the key data 410) and hence can have two or more possible permutations in the resulting visualization 490. Consequently, in some embodiments, every bit-wise difference between two keys would manifest itself as at least one visible difference in at least one of the visible features of the visualization.

Figure 5:
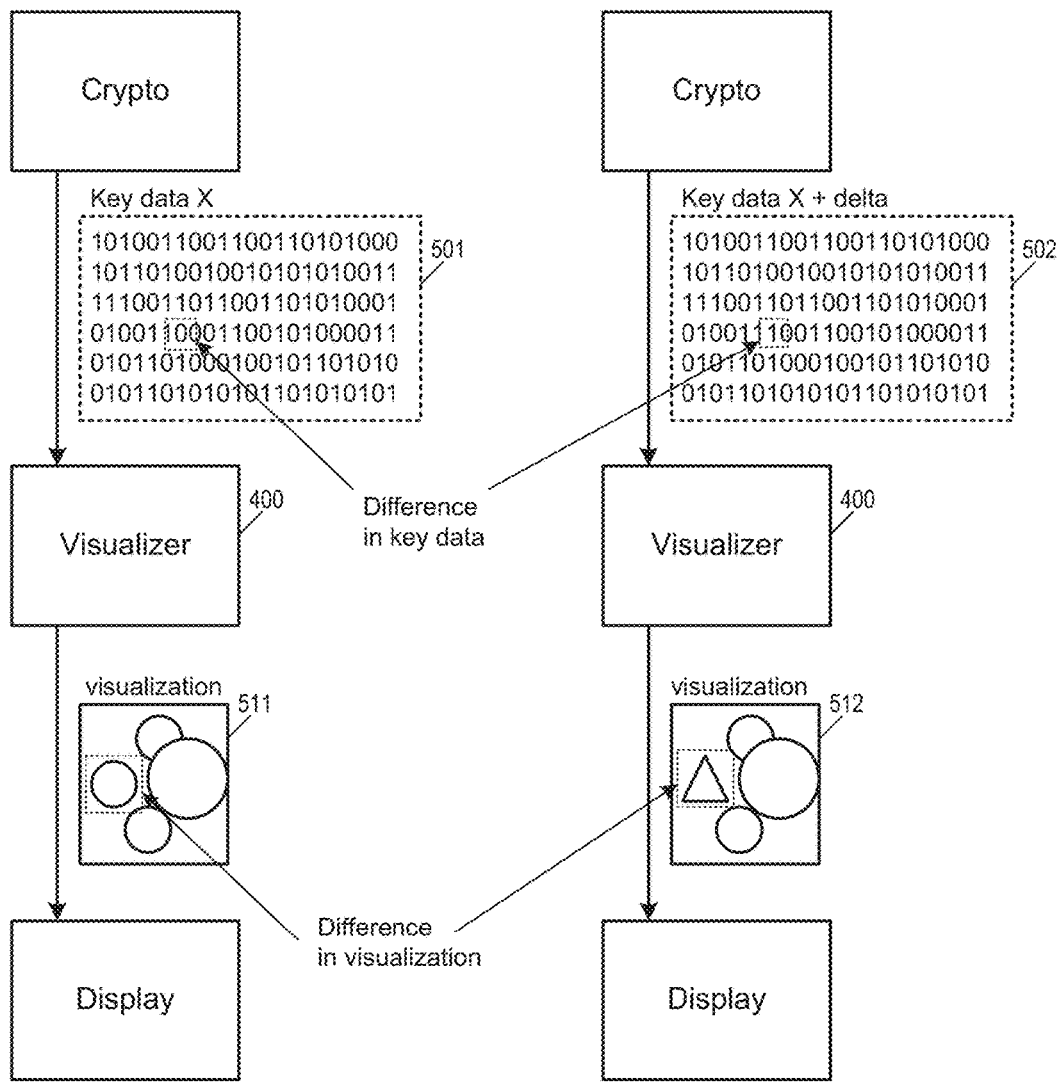
FIG. 5 illustrates two different visualizations that result from two keys that differ with each other in only one bit position.

FIG. 5 illustrates two different visualizations 511 and 512 that result from two keys 501 and 502 that differ with each other in only one bit position. In this example, the visual feature that is affected by the difference in key data is the shape of one of the objects in the visualization. Specifically, the one-bit differential in key data manifests itself as a circle 531 in the visualization 511 and as a triangle 532 in the visualization 512.

Figure 6:
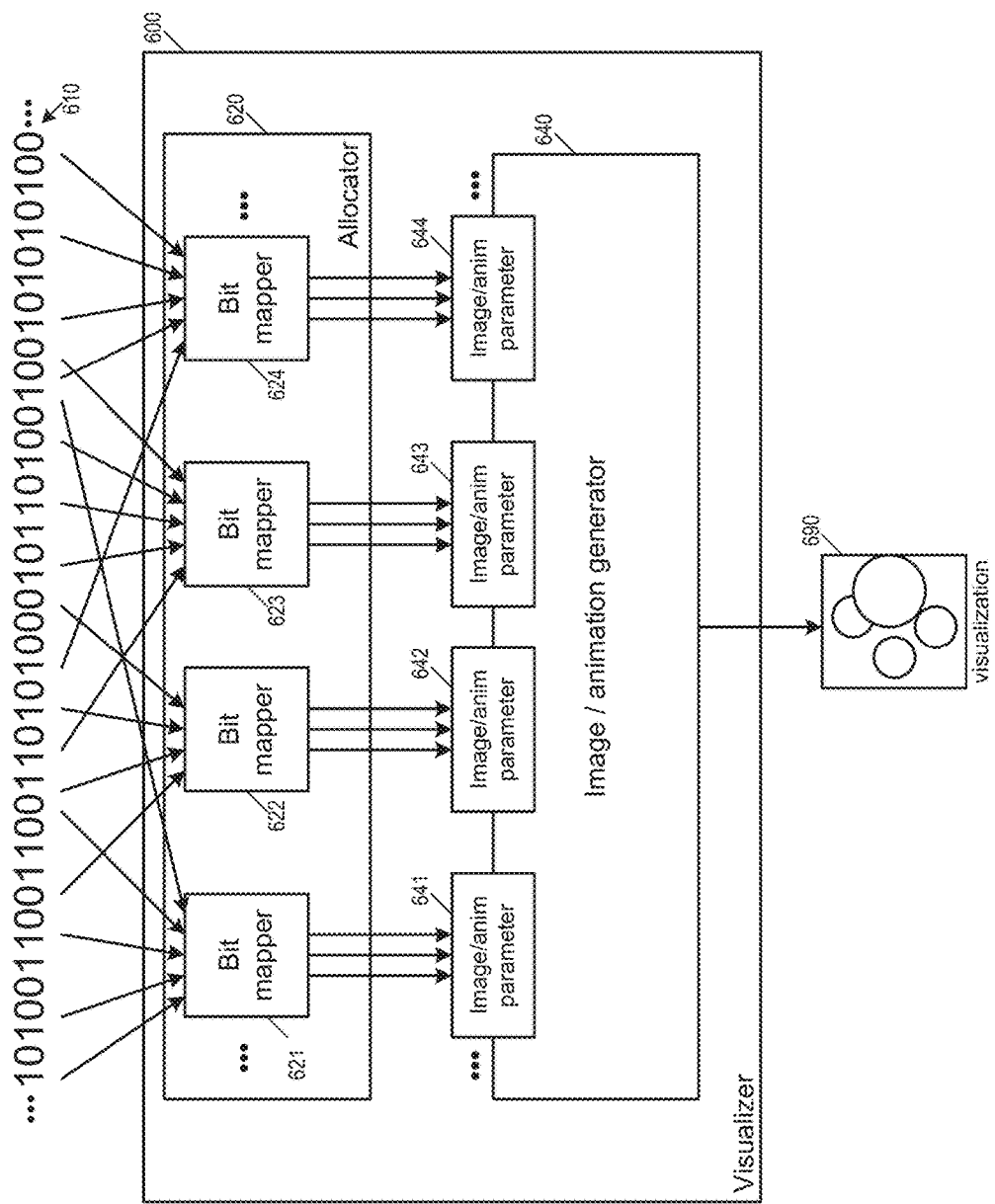
FIG. 6 illustrates a generic visualizer that processes key data bits from a key into a visualization.

FIG. 6 illustrates a generic visualizer 600 that processes key data bits from a key 610 into a visualization 690. The generic visualizer 600 includes a bit allocator 620 and an image/animation generator 640. The bit allocator 620 includes several bit-mappers 621-624. Each bit-mapper takes a set of bits from the key data 610 to create a parameter for the image/animation generator 640. As mentioned, different embodiments implement the bit-allocator differently, and the bit-mappers within the allocator are also implemented differently in different embodiments. In some embodiments, different bit-mappers within the bit-allocator 620 take in different subsets of the bits in the key data 610. Bit-mappers in different embodiments perform different Boolean functions (or just pass through without any Boolean function). In some embodiments, different bit-mappers in the same bit-allocator may perform different Boolean functions on different subsets of key data bits.

The image/animation generator 640 generates the visualization 690 based on a set of parameters 641-644. As illustrated, these parameters are supplied by the bit-mappers 621-624. Different embodiments use different types of visualization functions that generate images or animations based on different types of parameters. In some embodiments, each parameter corresponds to a visible feature of the visualization as in FIG. 4. In some embodiments, the parameters serve as numerical arguments to a function that generates the visualization. FIGS. 7-10 below illustrates some example visualization functions that use key data as parameters to generate images or animations as visualization for keys.

Figure 7:
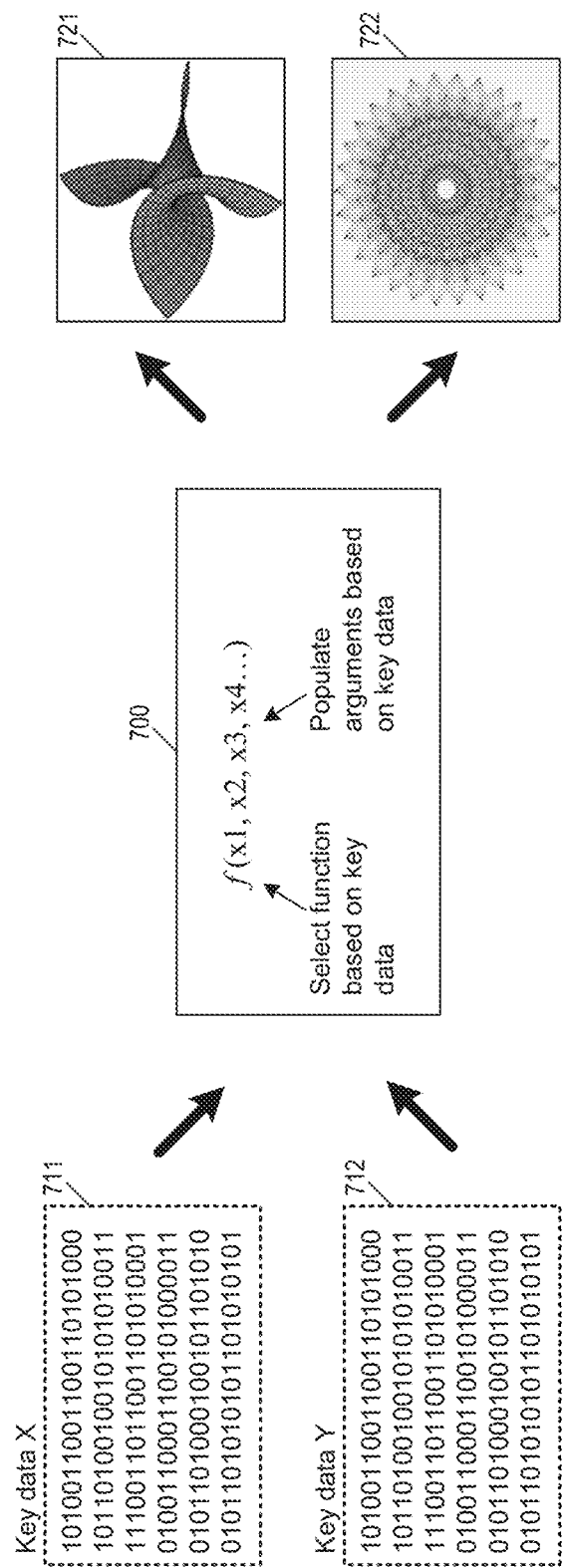
FIG. 7 illustrates a visualizer that uses numerical functions to generate 2D or 3D images as key visualizations.

FIG. 7 illustrates a visualizer 700 that uses numerical functions to generate 2D or 3D images as key visualizations. Specifically, the visualizer 700 uses key data to populate the numerical arguments of a numerical function in order to create the visualization (i.e., bits in the key data 710 are allocated/mapped to the numerical arguments). In some embodiments, the type of numerical function displayed is also determined by at least some of the bits in the key data 710. (In other words, the selection of the type of function is itself a parameter to the visualization that is based on the content of the key.) As illustrated, two different visualizations 721 and 722 are generated based on two different set of key data 711 and 712. The visualizations 721 and 722 differ not only in input parameters but also in type, because the difference in key data 711 and 712 results in different functions being selected to produce the visualizations 721 and 722.

Figure 8:
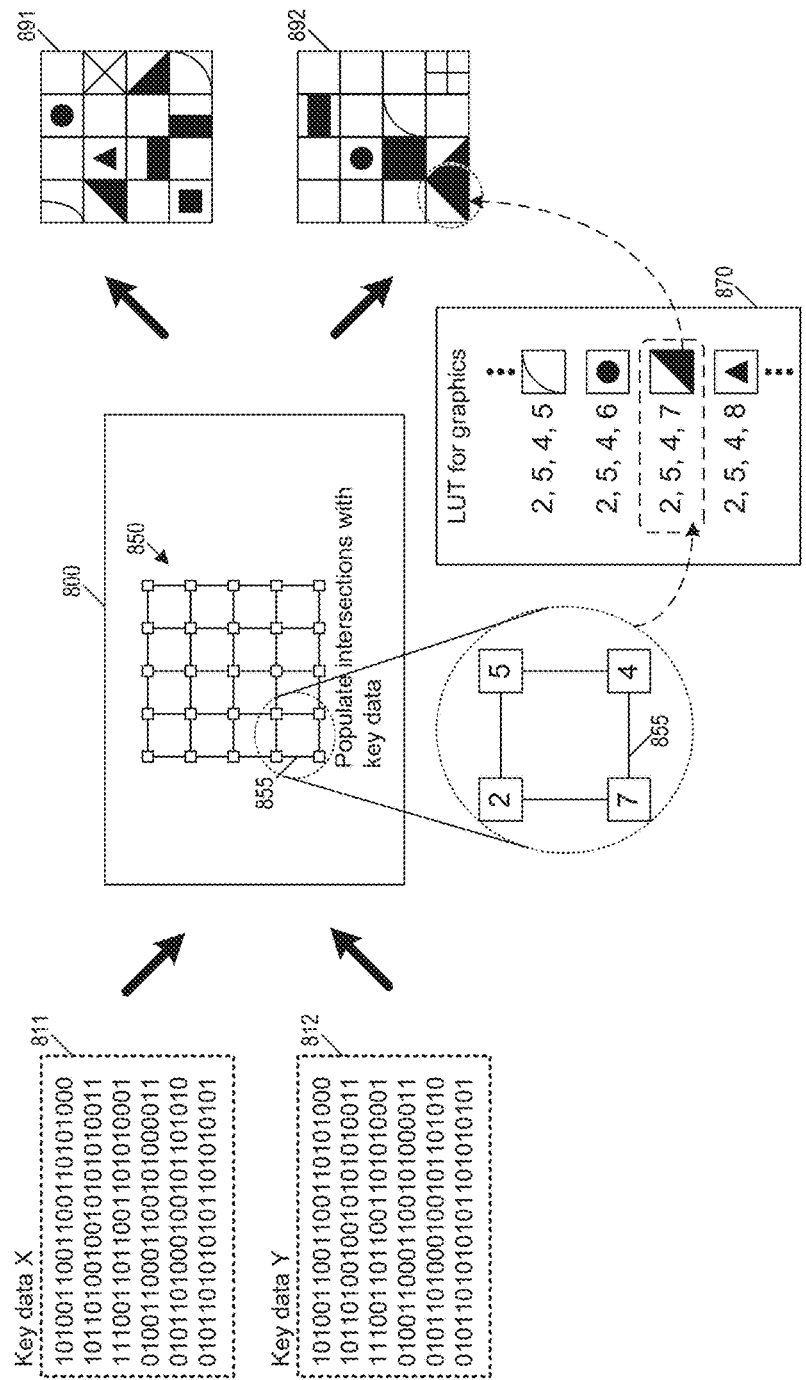
FIG. 8 illustrates a visualizer that partitions a display area into regions and fills the partitioned regions with patterns determined from key data.

In some embodiments, the display area for key visualization is partitioned into a number of regions (e.g., rectangular), where each region is populated or assigned with bits that are allocated/mapped from the key data. The bits populated to each region are then used to determine (e.g., by lookup) a graphical pattern for filling the region in the visualization. FIG. 8 illustrates a visualizer 800 that partitions a display area 850 into regions and fills the partitioned regions with patterns determined from key data. The visualizer 800 creates visualizations 891 and 892 from bits in key data 811 and 812, respectively.

To create a visualization for a key (e.g., 811 or 812), the visualizer 800 partitions the display area 850 into regions and assigns/allocates/maps bits from the key to each partitioned region of the display area. In some embodiments, the display area is partitioned into rectangular regions by a set of intersecting lines, and the visualizer 800 assigns or populates each intersection a set of bits that are derived from the key data. Since each rectangular region is surrounded by four such intersections at its four corners, each rectangular region is associated with four numerical values. For example, when creating the visualization 892 from the key data 812, the bits from the key data 812 are allocated to the intersections of the display area 850 such that the corners of a rectangular region 855 are assigned values 2, 5, 4, 7, respectively. These four values are in turn used to determine a pattern (e.g., by looking up a graphics table 870) that is used to fill the rectangular region 855 when creating the visualization 892.

Figure 9:
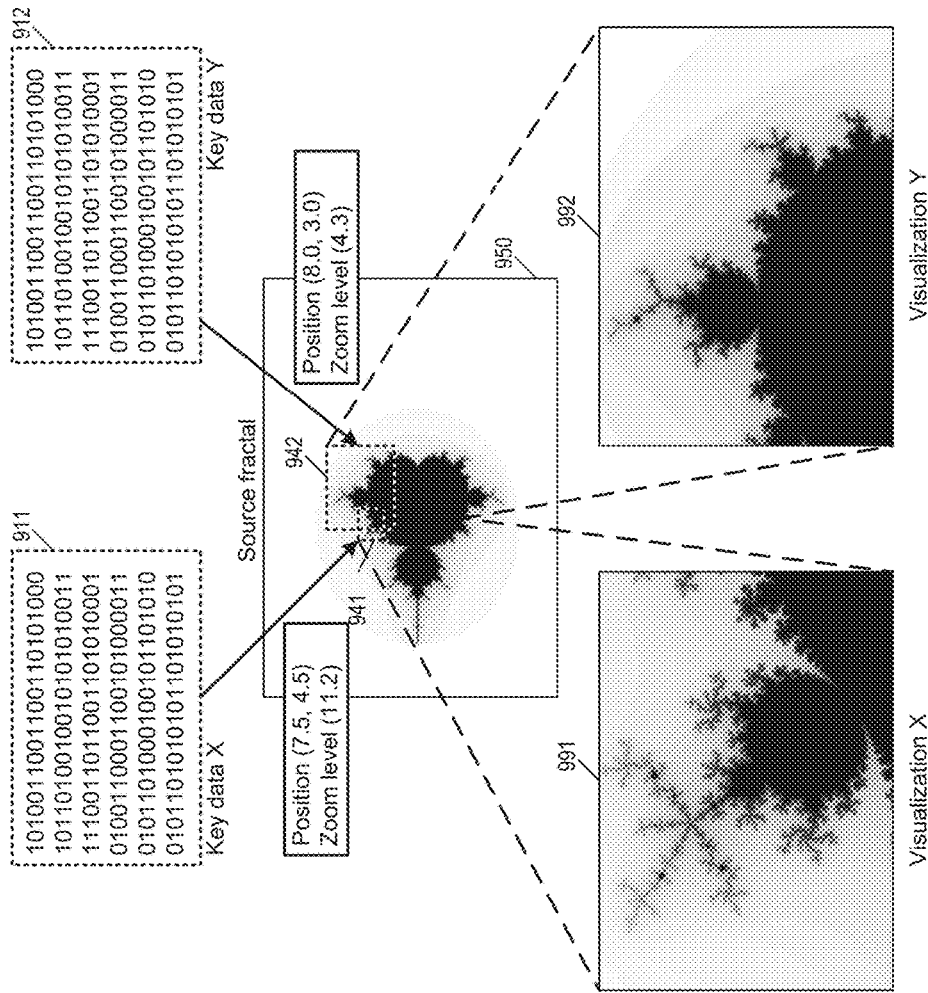
FIG. 9 illustrates a visualizer that uses windows over a fractal pattern for visualizing key data.

Some embodiments use fractal patterns as basis for generating visualizations. A fractal is a mathematical set that exhibits a similar pattern that displays at every scale. Some fractal patterns have infinite amount of visual detail, regardless of zooming level. Different windows at different positions and/or different zooming levels over such a fractal pattern would nearly always exhibit visually very distinct images. Some embodiments therefore use a window over a fractal pattern as the visualization of a key. The position and the zoom level of the window is derived from the key data in some embodiments. FIG. 9 illustrates a visualizer 900 that uses windows over a fractal pattern for visualizing key data. Specifically, the visualizer 900 creates visualizations 991 and 992 respectively from bits in key data 911 and 912.

To create a visualization of a key (e.g., 911 or 912), the visualizer 950 uses bits from the key to derive the position and zoom level of a window over a source fractal pattern 950. In this example, the key data of the key 911 is mapped to a window 941 at position (7.5, 4.5) and zoom level 11.2, while the key data of the key 912 is mapped to a window 942 at position (8.0, 3.0) and zoom level 4.3. The fractal pattern in the window 941 then becomes the visualization 991 of the key 911, while the fractal pattern in the window 942 becomes the visualization 992 of the key 912.

Figure 10:
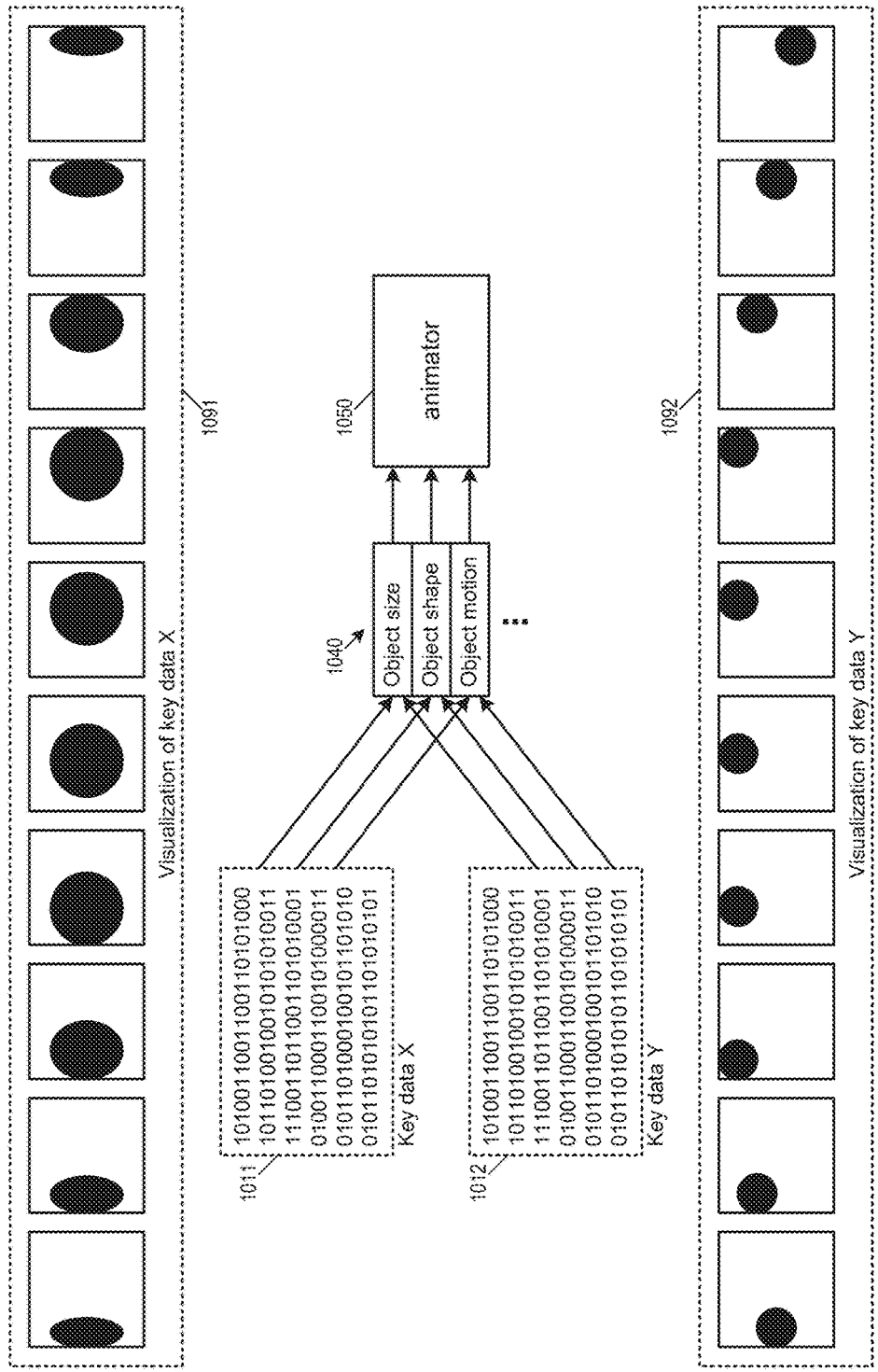
FIG. 10 illustrates a visualizer that animates its visualization based on key data.

Some embodiments animate the visualization, where the parameters such as an object's shape, size, color, and motion are determined by the content of a key. FIG. 10 illustrates a visualizer 1000 that animates its visualization based on key data for some embodiments. As illustrated, the visualizer 1000 includes an animator 1050 that animates an object that moves about within the display area. The visualizer maps/allocates/assigns/bits from the keys to parameters 1040 of the animation. The parameters 1040 defines the object's size, shape, color, motion, etc. In this example, the data in the key 1011 maps into a large ball that bounces between walls for the visualization 1091, while the data in the key 1012 maps into a smaller ball that goes up and down the display area for the visualization 1092.

FIGS. 7-10 illustrates but a few examples of possible visualization of key data for enhanced pairing verification for some embodiments of the invention. Many other ways of converting data bits in a key into visualization are also possible. Furthermore, in some embodiments, a device may select different types of visualization base on the content of the key, which would make it even easier for the user to detect invalid shared key and failed pairing (e.g., when one device displays a fractal image while the other device displays an animation of an bouncing ball.)

V. Computing Device

In some embodiments, a device that uses the enhanced pairing verification described above is a computing device. In some embodiments, a computing device such as a mobile phone/smart phone, tablet computer, laptop computer, or desktop computer can all operate software components that allow them to pair with another computing device and to use visualization of shared secret key to determine if the pairing is successful and secure.

Figure 11:
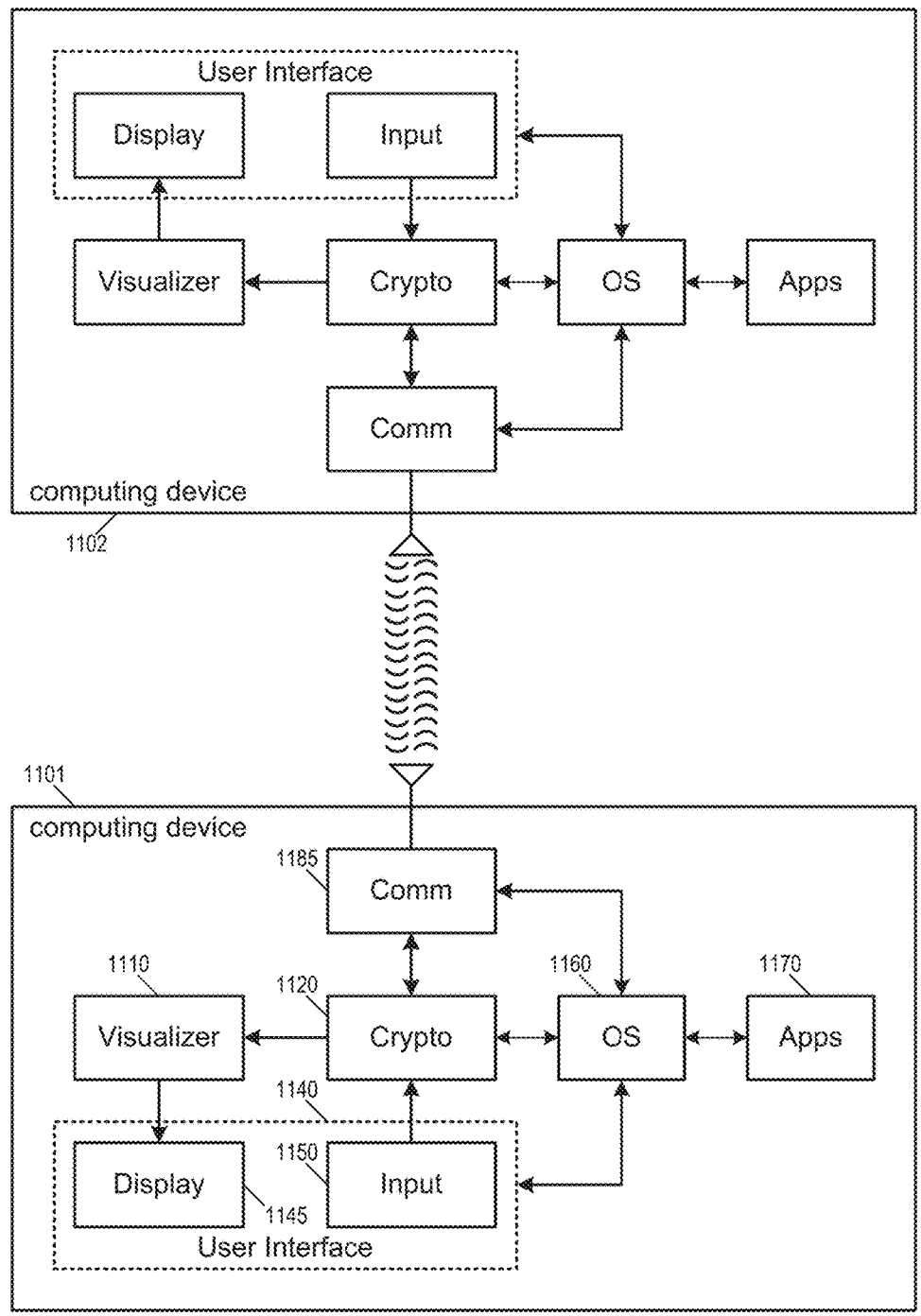
FIG. 11 illustrates the architecture of a computing device that performs enhanced pairing verification by displaying a visualization of a shared key.

FIG. 11 illustrates the architecture of a computing device 1101 that performs enhanced pairing verification by displaying a visualization of a shared key for some embodiments of the invention. The computing device 1100 includes a visualizer 1110, a crypto engine 1120, a communications transceiver 1185, a user interface module 1140, an operating system 1160, and applications 1170.

The communications transceiver 1185 is for communicating data with other devices, including potential pairing partners such as a device 1102. The transceiver 1185 can be for wireless or wired mediums and protocols (e.g., Bluetooth or WiFi). The data received by the communications transceiver 1185 is relayed to the crypto engine 1120 and the operating system 1160. The communications transceiver 1185 also transmits data supplied by the crypto engine 1120 and the operating system 1160.

The operating system 1160 allows applications 1170 to execute on the device 1101 by operating the resources of the device 1101. As illustrated, the operating system 1160 exchanges data with the communications transceiver 1185, the user interface module 1140, and the crypto engine 1120. In some embodiments, the operating system receives a shared key from the crypto engine for encrypting and decrypting data communications with the pairing partner device 1102. In some embodiments, the operating system does not perform encryption or decryption but lets the crypto engine 1120 encrypt outgoing data and decrypt incoming data by using the shared key.

The user interface module 1140 includes a display module 1145 and an input module 1150. The input module 1145 may include drivers for translating signals from a keyboard, mouse, touchpad, drawing tablet, touchscreen, etc. A user interacts with one or more of these input devices, which send signals to their corresponding device driver. The device driver then translates the signals into user input data that can be used by the operating system 1160 and the crypto engine 1120. The display module 1145 translates the signals from within the device 1101 from the operating system 1160 and modules such as the visualizer 1110 into pixel information that is sent to a display device. The display device may be an LCD, plasma screen, CRT monitor, touchscreen, etc. In some embodiments, the display module 1145 is for displaying the visualization of the proposed shared key to the user and the input module 1150 is for receiving user input regarding whether the visualization of the key matches the visualization produced and displayed by the other device.

The user interface module 1140 of some embodiments implements a graphical user interface (GUI) for the computing device 1101 that provides users with numerous ways to perform different sets of operations and functionalities. For example, some embodiments of the invention let the user indicate whether the shared key is valid (upon visually comparing the visualizations of the shared key) by selecting a user selectable item provided by the GUI.

In some embodiments, these operations and functionalities are performed based on different commands that are received from users through different input devices (e.g., keyboard, trackpad, touchpad, mouse, etc.). Some embodiments use a cursor in the GUI to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the input device. An example of a device with such functionality is a touch screen device (e.g., as incorporated into a smart phone, a tablet computer, etc.). In some embodiments with touch control, a user directly manipulates objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The crypto engine 1120 in some embodiments holds the private secret key of device. It also generates encrypted version of the private secret key as well as exchange the encrypted private secret key with the potential pairing partner (through the transceiver 1185) and generates the corresponding shared secret key. In some embodiments, the encryption, decryption, as well as the generation of the proposed shared secret are performed according to Diffie-Hellman exchange by using an encryption standard that is adopted by devices 1101 and 1102. The generated shared secret key is supplied to the visualizer 1110. In some embodiments, the crypto engine also receives the result of the user verification through the input module 1150 of the user interface 1140. Once the user has verified the validity of the shared key, the validated shared key is supplied to the operating system 1160 in some embodiments for decrypting and encrypting all subsequent data communication (e.g., to and from applications 1170) with the pairing partner device 1102. In some embodiments, the crypto engine 1120 handles the decrypting and encrypting of data with the pairing partner device 1102 by using the validated shared key as a symmetric key cypher, with unencrypted outgoing data supplied by the operating system 1160 and decrypted incoming data provided to the operating system 1160. For some embodiments, the operations of the crypto engine are described above in Section I.

The visualizer 1110 generates a visualization based on the key data (i.e., the proposed shared secret or key) from the crypto engine 1120. The visualizer 1110 takes the bits in the key data and allocates/maps/assigns them as parameters to a visualization function and produces a visualization of the key data. The produced visualization is supplied to the display module 1145 in the user interface 1140. For some embodiments, the operations of the visualizer are described above in Section II.

VI. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
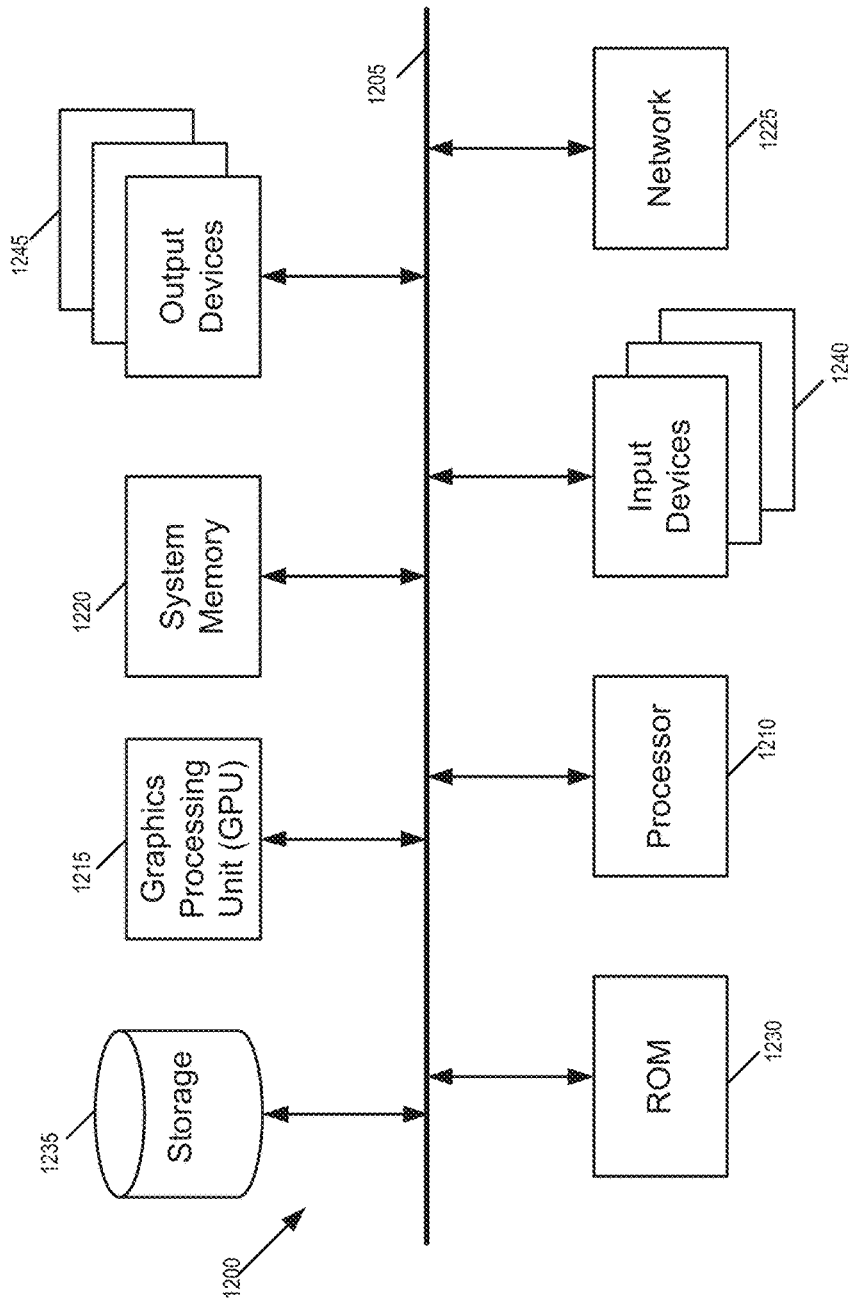
FIG. 12 conceptually illustrates an electronic system with which some embodiments of the invention are implemented.

FIG. 12 conceptually illustrates an electronic system 1200 with which some embodiments of the invention are implemented. The electronic system 1200 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1200 includes a bus 1205, processing unit(s) 1210, a graphics processing unit (GPU) 1215, a system memory 1220, a network 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the GPU 1215, the system memory 1220, and the permanent storage device 1235.

From these various memory units, the processing unit(s) 1210 retrieves instructions to execute and data to process in order to execute the processes of the invention. The processing unit(s) may be a single processor or a multi-core processor in different embodiments. Some instructions are passed to and executed by the GPU 1215. The GPU 1215 can offload various computations or complement the image processing provided by the processing unit(s) 1210.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash memory device, etc., and its corresponding disk drive) as the permanent storage device. Like the permanent storage device 1235, the system memory 1220 is a read-and-write memory device. However, unlike storage device 1235, the system memory 1220 is a volatile read-and-write memory, such a random access memory. The system memory 1220 stores some of the instructions and data that the processor needs at runtime. In some embodiments, the invention's processes are stored in the system memory 1220, the permanent storage device 1235, and/or the read-only memory 1230. For example, the various memory units include instructions for processing multimedia clips in accordance with some embodiments. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alphanumeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIG. 3) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method comprising:
    generating, at a first device, a set of validation data for secured communication with a second device;
    generating and displaying a visualization of the set of validation data to a user of the first device by using a first set of data bits in the set of validation data to compute a location and a second set of data bits in the set of validation data to compute a zoom level of a window over a pattern, the window identifying a portion of the pattern that serves as the visualization of the set of validation data; and
    using the set of validation data to establish a secure communication with the second device after receiving a user validation of the set of validation data based on the visualization of the set of validation data.

2. The method of claim 1, wherein the pattern provides different visualizations at different positions or different zoom levels.

3. The method of claim 1, wherein the pattern has different visual features based on location and zoom level.

4. The method of claim 1, wherein the pattern is a fractal image.

5. The method of claim 1, wherein the pattern is a mathematically generated pattern that provides visual features at any zoom level.

6. The method of claim 1, wherein the secured communication comprises the first device using the set of validation data as a shared key to encrypt and decrypt data communication with the second device.

7. The method of claim 1, wherein the set of validation data is generated based on an exchange of a private secret of the first device and a private secret of the second device.

8. The method of claim 1, wherein the visualization is a first visualization that is displayed to the user for a visual comparison with a second visualization generated by the second device, wherein the user validation is for verifying that the set of validation data generated by the first device is identical to a set of validation data generated by the second device based on said visual comparison.

9. A device comprising:
    a transceiver for data communication with other devices;
    a crypto engine for generating a set of validation data for pairing with another device; and
    a visualizer for generating a visualization of the set of validation data for a user to validate the pairing with the other device, the visualizer using a first set of data bits in the set of validation data to compute a location and a second set of data bits in the set of validation data to compute a zoom level of a window over a pattern, wherein the window identifies a portion of the pattern that serves as the visualization of the set of validation data.

10. The device of claim 9, wherein the crypto engine generates the set of validation data based on an exchange of private secrets with the other device.

11. The device of claim 9, wherein the device further comprises a display for displaying the visualization to the user and a user interface for receiving a user validation of the set of validation data based on the visualization, wherein the device encrypts and decrypts communications by using the set of validation data as a shared key with the other device after receiving the user validation.

12. The device of claim 9, wherein the pattern provides different visualizations at different positions or different zoom levels.

13. The device of claim 9, wherein the pattern has different visual features based on location and zoom level.

14. The device of claim 9, wherein the pattern is a fractal image.

15. The device of claim 9, wherein the pattern is a mathematically generated pattern that provides visual features at any zoom level.

16. A non-transitory computer readable medium storing a program for execution by one or more processing units in a computing device, the program comprising sets of instructions for:

generating a shared key for secured communication with a partner device;

generating a visualization of the shared key to a user by partitioning a display area into a plurality of regions and determining a graphical pattern for each of the plurality of regions based on data bits in the shared key, wherein a first set of the data bits in the shared key is used to determine a first graphical pattern for a first region and a second set of the data bits in the shared key is used to determine a second, different, pattern for a second region; and using the shared key to establish secure communication with the partner device after receiving a user validation of the shared key based on the visualization of the shared key.

17. The non-transitory computer readable medium of claim 16, wherein the set of instructions for determining a graphical pattern for each of the plurality of regions based on the data bits in the shared key comprises a set of instructions for assigning data bits in the shared key to each of the plurality of regions.

18. The non-transitory computer readable medium of claim 16, wherein the visualization is a first visualization that is displayed to the user for a visual comparison with a second visualization generated by the partner device.

19. The non-transitory computer readable medium of claim 18, wherein the user validation is for verifying that the shared key generated by the device is identical to a shared key generated by the partner device based on said visual comparison.

20. The non-transitory computer readable medium of claim 16, wherein the set of instructions for generating the shared key comprises a set of instructions for performing a key exchange protocol with the partner device.

* * * * *